INVENTORS
Arvids Bergs
John T. M. Lee

INVENTORS
Arvids Bergs
John T. M. Lee

Feb. 11, 1969  A. BERGS ET AL  3,426,578

IMPACT TESTING APPARATUS

Filed Jan. 20, 1967  Sheet 5 of 5

INVENTORS
Arvids Bergs
John T. M. Lee
BY

United States Patent Office 3,426,578
Patented Feb. 11, 1969

3,426,578
IMPACT TESTING APPARATUS
Arvids Bergs, Spring City, and John T. M. Lee, Audubon, Pa., assignors to Atlas Chemical Industries, Inc., Wilmington, Del., a corporation of Delaware
Filed Jan. 20, 1967, Ser. No. 610,549
U.S. Cl. 73—12        8 Claims
Int. Cl. G01n 3/30

ABSTRACT OF THE DISCLOSURE

In the art of impact testing, an apparatus for conducting controlled attitude tests wherein a drop table releases a test specimen supported at a fixed angle for impact from a height above an impact base such that substantially no variation of the fixed angle for impact occurs.

---

This invention relates to an impact testing apparatus and more particularly to an impact testing apparatus for conducting controlled attitude tests.

Considerable effort has been given to the development of testing machines which subject test specimens to controlled impact conditions in a test laboratory in order to perfect and prove the ability of the test specimen to perform successfully in actual operation.

Development of a versatile impact testing machine is complicated by the fact that the required test conditions cover a wide range of impact parameters. Some of these impact parameters are duration, magnitude, and angle of the impact.

A relatively successful approach to impact testing involves an apparatus which generally comprises a drop table guided both for free fall and impact against a fixed base. A test specimen is mounted on the drop table and means are provided for elevating the table above the base and then quickly releasing the table for free fall by gravity.

In addition to the many imperfections of the prior art impact testing apparatus in proving the ability of a test specimen to perform successfully in actual operation, no suitable means has been developed to date which effectively controls the attitude of the test specimen during free fall conditions to any desirable degree for impact against an impact base. Under free fall conditions from relatively high drop heights, the test specimen will either vary its angle of descent, or if the angle is controlled, the drop weight includes both the weight of a drop table and the weight of the test specimen. It has now been found, however, that by the practice of the present invention, an apparatus is provided which is useful for conducting controlled attitude tests without imparting the weight of a drop table to the drop weight of the test specimen.

Generally stated, therefore, the present invention provides an apparatus for impact testing which comprises, a main support frame above a point of impact; a carriage assembly supportable by said main support frame; and having test specimen gripping means; guide means vertically suspended from said main support member and cooperating with said carriage assembly so as to permit free fall of the carriage assembly in a fixed attitude toward said point of impact; detent means connected operatively with said test specimen gripping means; detent release means disposed above said impact point for releasing said detent means and said test specimen gripping means from test specimen gripping position; lifting means for elevating said carriage assembly to a release height; and carriage deceleration means disposed above said impact point.

In the drawings:
FIG. 1 is a front elevational view of the apparatus of the present invention;

Figure 1:
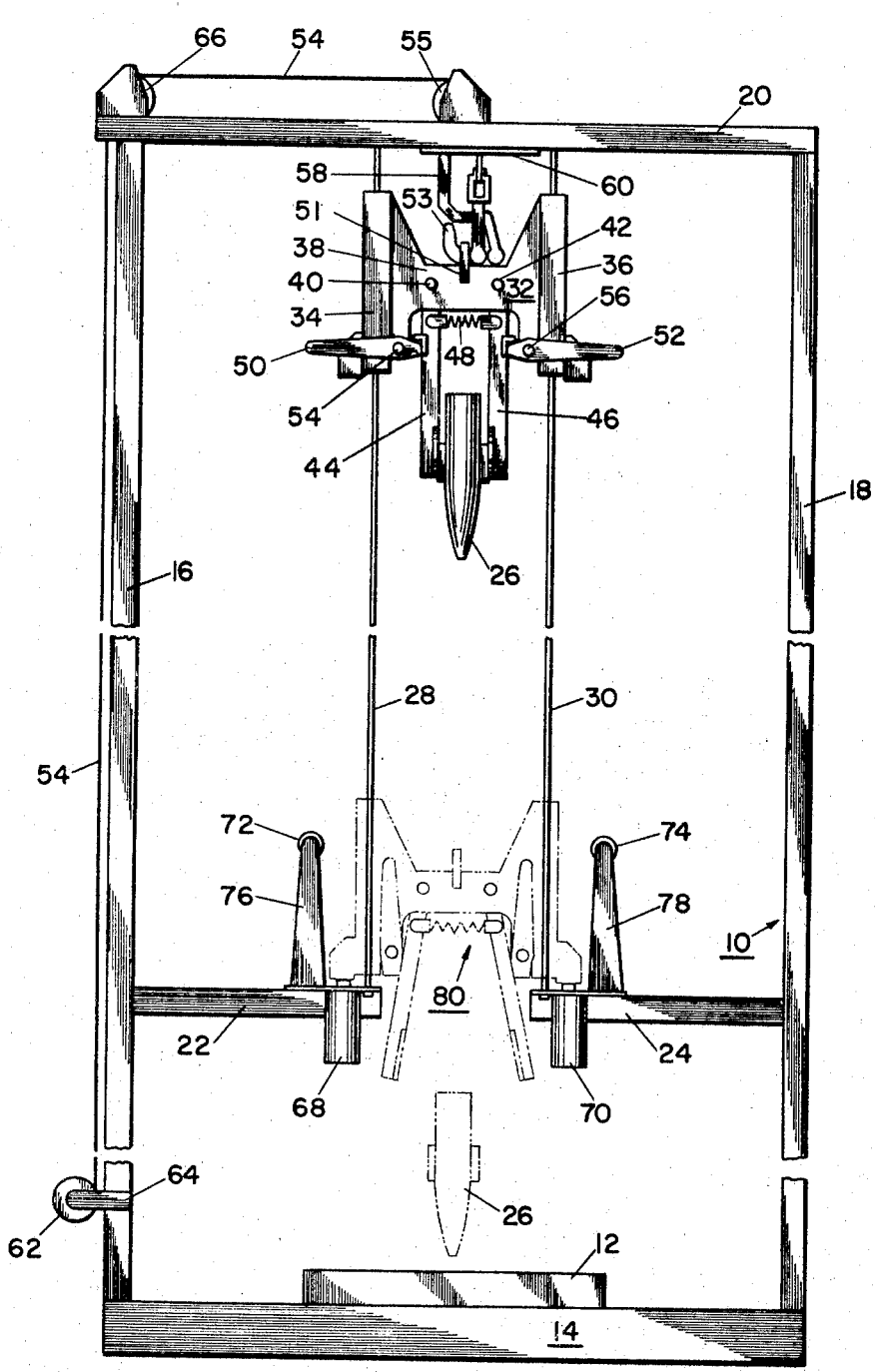

Referring to FIG. 1, there is illustrated impact testing apparatus 10 having impact base 12 suitably positioned on foundation 14. Impact base 12 is desirably formed of hardened steel with a top forming a horizontal platform which receives, by impact, a specimen being tested. A main support frame is secured by any suitable means to foundation 14 by the lower ends of channel members 16 and 18. Upper frame support member 20 connects channel members 16 and 18 at the upper ends thereof. Intermediate frame support members 22 and 24 are also provided at a suitable height from which test specimen 26 is permitted to fall by gravity after accelerating under controlled attitude conditions. Connecting intermediate frame support member 22 and upper frame support member 20 is cable 28, which along with cable 30 from intermediate frame support member 24 to upper frame support member 20 form the guide means of the present apparatus.

Test specimen carriage assembly 32 controls the attitude of the test specimen during the free fall period from the level of release of the carriage assembly at a point near upper frame support member 20 to a height of test specimen release above the level of intermediate frame support members 22 and 24. The carriage assembly 32 is slidably supported on guide cables 28 and 30 by relatively elongated sleeves 34 and 36, respectively, which may be integral with body frame 38. Elongated sleeves 34 and 36 may contain replaceable bushings formed of materials such as of bronze, nylon or the like to control friction and wear of the related elements about the guide wires.

Pivotally attached to body frame 38 by pins 40 and 42 are test specimen gripping means illustrated as clamp arms 44 and 46 which are normally maintained in spread position by compression spring 48. Clamp arms 44 and 46 are held in test specimen gripping position by clamp detent means appearing as detent members 50 and 52 which pivot through an arc of about 90° on pins 54 and 56 respectively. Detent members 50 and 52 may be held in detent position against clamp arms 44 and 46 by any suitable means as will become more apparent hereinafter.

Test specimen carriage assembly 32 is illustrated in FIG. 1 at a level just prior to free fall release. The carriage assembly is provided with catch 51 attached to body frame 38 for receiving hook 53 of the lifting means which includes support wire 54 traveling about pulley 55 disposed on upper frame support member 20. Carriage assembly release lever 58 forming part of the lifting means releases the carriage assembly upon contact, during lifting, with plate 60 attached to upper frame support member 20.

Support wire 54 is operated by lifting either a manual or power-operated unit 62 illustrated as being secured to channel member 16 by brace 64. Support wire 54 also travels over pulley 66 at the corner of upper frame support member 20.

Upon release of test specimen carriage assembly 32 by hook 53, the test specimen carriage assembly falls by gravity until it is arrested in its downward movement by stops 68 and 70 which may be any type of shock absorber. Just prior to the arresting of test specimen carriage assembly 32, clamp detent members 50 and 52 extending to a horizontal position come in contact with a detent release means which is illustrated as trip rollers 72 and 74 supported respectively on vertical posts 76 and 78. Contact by the detent members 50 and 52 with the trip rollers causes the detent members to pivot about pins 54 and 56 to the vertical position and thereupon, compression spring 48 forces clamp arms 44 and 46 apart to release test specimen 26. Upon being arrested by stops 68 and 70, test specimen carriage assembly 32 assumes phantom position 80 illustrated in FIG. 1.

The level of release of test specimen 26 from the carriage assembly 32 above impact base 12 may vary as desired. It has been found, however, that when the detent release means or trip rollers 72 and 74 are suitably disposed at a level such that the release height of the test specimen from the carriage assembly is within a level from which substantially no variation of attitude control of the test specimen results during free fall after release from the carriage assembly. For example, in the case of a forty foot release height for the test specimen when supported by the carriage assembly, it is found that a test specimen release height from the carriage assembly of between about 8 to about 10 feet above impact base 12 is suitable for proper attitude control of the test specimen during free fall conditions.

Figure 2:
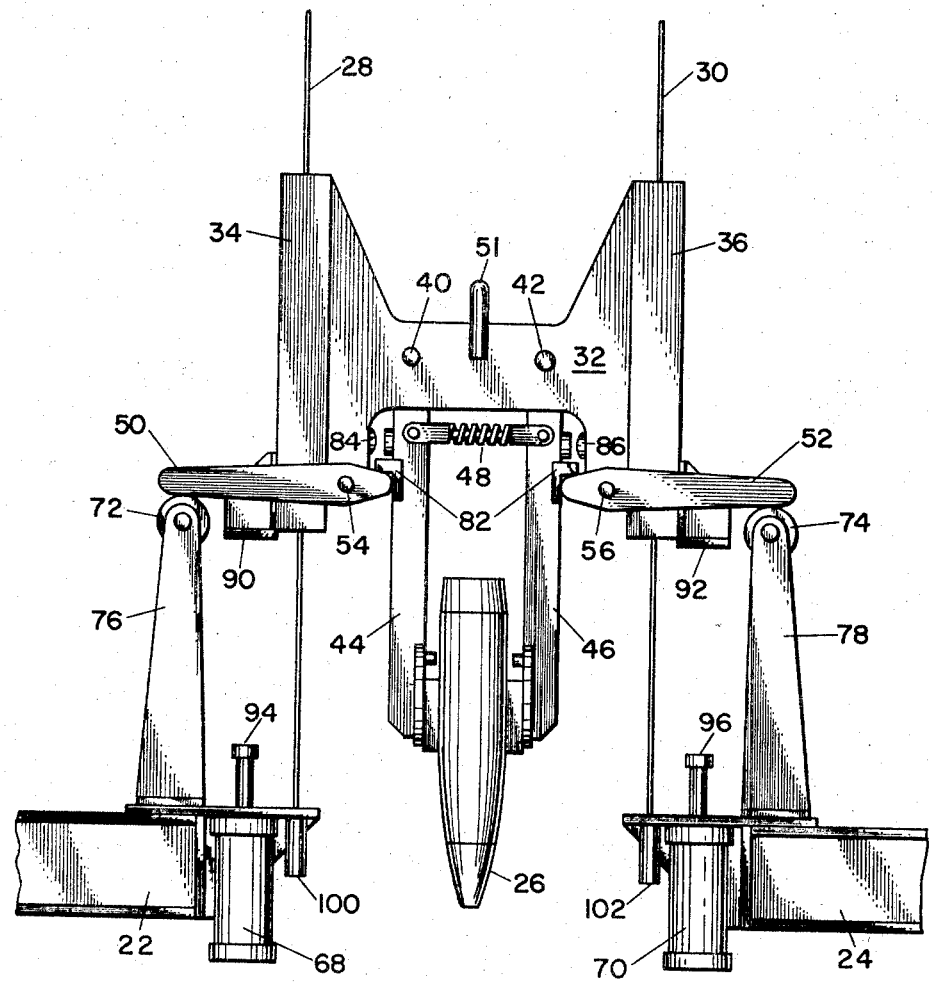
FIG. 2 is a front elevational view illustrating a test specimen carriage assembly of the present apparatus at a point just prior to the level of release of the test specimen.
Figure 3:
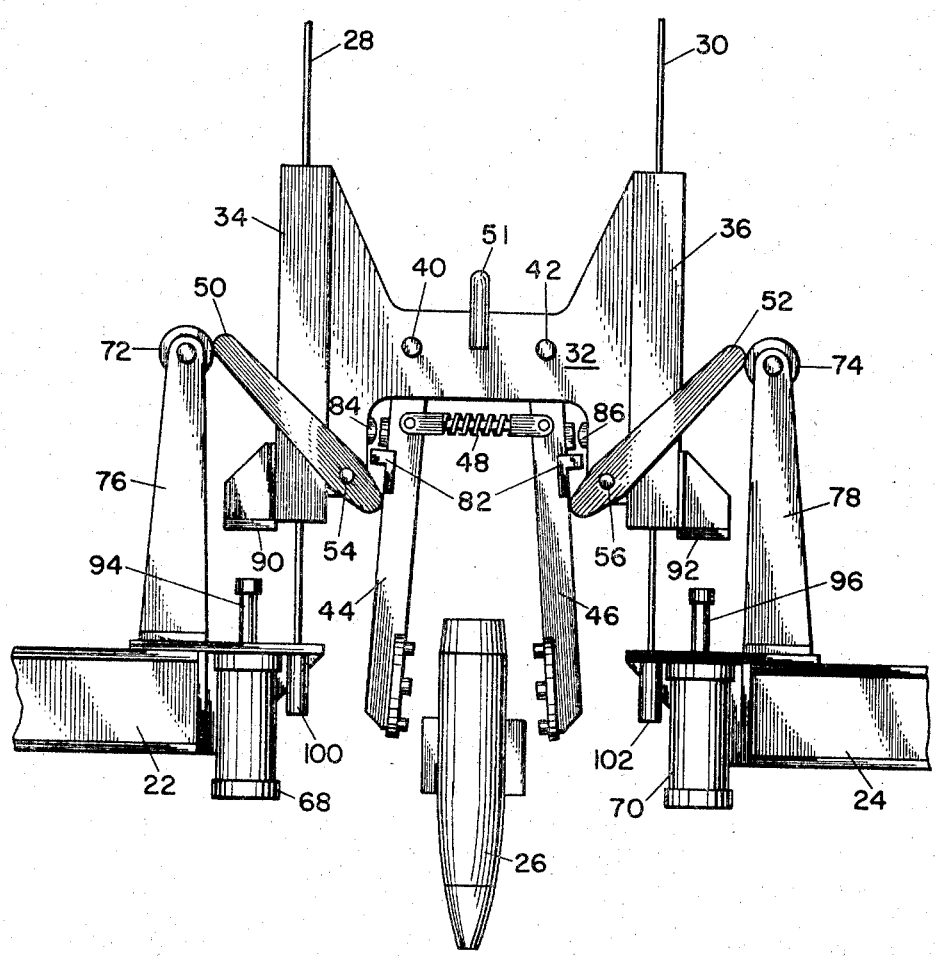
FIG. 3 is a front elevational view illustrating the test specimen carriage assembly at a point after the level of release of the test specimen.

FIGS. 2 and 3 illustrate the test specimen carriage assembly in greater detail relative to the method of test specimen release from the carriage assembly.

In free fall after release from a point near the top of the present apparatus 10, test specimen carriage assembly 32 has clamp detent members 50 and 52 extending to the horizontal position for compression of spring 48 by clamp arms 44 and 46. In order to prevent accidental release of test specimen 26, holds 82 may be provided on clamp arms 44 and 46. Additionally, elastic shock control means 84 and 86 for the clamp arms after detent release may be included as part of the carriage assembly if desired.

As clamp detent members 50 and 52 contact trip rollers 72 and 74, the falling weight of carriage assembly 32 causes the detent members to pivot about pins 54 and 56 respectively as illustrated in FIG. 3. When clamp detent members are pivoted away from the horizontal positon, spring 48 forces clamp arms 44 and 46 apart and thus effects the release of test specimen 26. After test specimen 26 has been released from carriage assembly 32, carriage assembly shoes 90 and 92 come in contact with pistons 94 and 96 respectively of shock absorbers 68 and 70, which may be either a spring type or a hydraulic type of shock absorber, as the carriage assembly is decelerated. These shock absorbers cushion the arresting of the carriage assembly and prevent damage to the assembly as it falls from the initial release height.

In addition to the elements illustrated in FIGS. 2 and 3, guide wire holders 100 and 102 are employed to retain guide wires 28 and 30 under tension.

Figure 4:
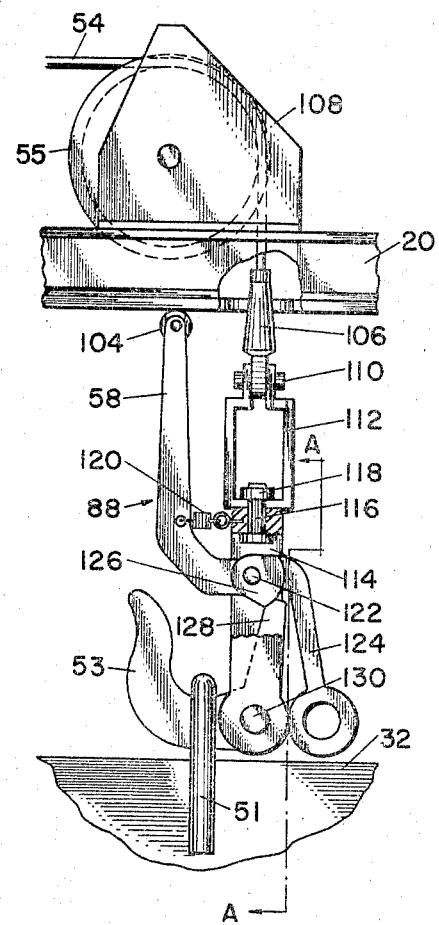
FIG. 4 is a front elevational view of an automatic release lifting means for use in elevating the test specimen carriage assembly of the present apparatus.
Figure 5:
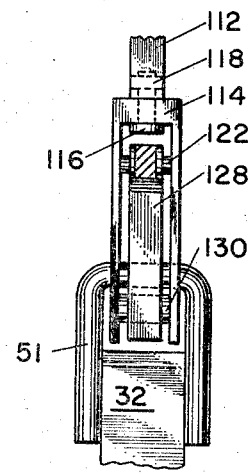
FIG. 5 is a side elevational view illustrating a yoke mechanism for the automatic release lifting means when taken as a partial section along section lines A—A of FIG. 4.

FIG. 4 represents a front elevational view of an automatic release lifting means 88 for use in elevating the test specimen carriage assembly of the present apparatus and FIG. 5 is a side elevational view taken along section lines A—A thereof. The automatic release lifting means releases test specimen carriage assembly 32 as carriage release lever 58 having roller 104 at one end thereof contacts upper frame support member 20 during the elevating process. Lift stopper 106, which may be an electrical cut-off breaker when power lift means 62 is employed, is disposed at one end of support wire 54 to prevent damage to pulley 55, in housing 108, and to lifting means 88. Lift stopper 106 is joined by pin 110 to bracket 112. Bracket 112 is attached to yoke 114 by bolt 116 and nut 118. Spring 120 is employed as a suitable means to return carriage release lever 58 to normal position after test specimen carriage assembly 32 is released from hook 53. Carriage release lever 58 pivots about axle 122 and may include counter-balance arm 124 and hook detent 126 as integral members thereof. Hook detent 126 engages hook arm 128 as illustrated in FIG. 4 during the hook locking position while the lifting means raises the test specimen carriage assembly 32 to the release height. As roller 104 of carriage release lever 58 contacts upper frame support member 20, the carriage release lever pivots counterclockwise about axle 122 and hook detent 126 disengages hook arm 128 whereupon the weight of test specimen carriage assembly 32 causes hook 53 to pivot about hook axle 130 to release catch 51 from engagement. Release of catch 51 from hook 53 causes test specimen carriage assembly 32 to fall by influence of gravity.

Figure 6:
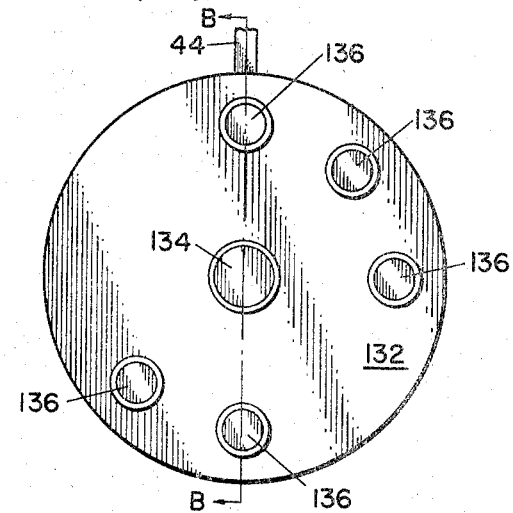
FIG. 6 is a front elevational view of a test specimen gripping means suitable for use with the test specimen carriage assembly of the present invention.
Figure 7:
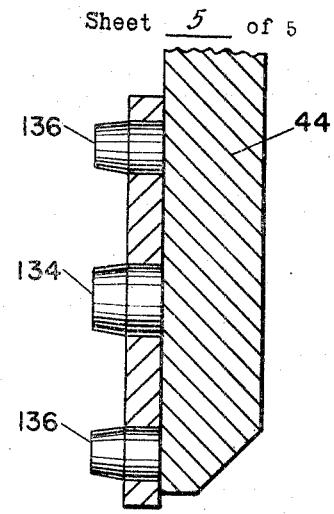
FIG. 7 is a side elevational view further illustrating the test specimen gripping means when taken as a half section along section lines B—B of FIG. 6.

FIG. 6 is a front elevational view of a test specimen gripping means suitable for use with test specimen carriage assembly 32 of the present invention and FIG. 7 is a sectional view thereof taken along section lines B—B of FIG. 6. Attached to, for example, clamp arm 44 is plate 132 having central cleat 134 and peripheral cleats 136 suitably positioned thereabout. Desirably, central cleat 134 is of slightly larger diameter than peripheral cleat 136 to establish a standard position.

The peripheral cleats 136 may be positioned at various radial angles about central cleat 134 to fix the angle at which the test specimen is supported relative to the horizontal level of the impact base. In this fashion, the attitude of the test specimen may be controlled at any position relative to the horizontal impact base during free fall. When the test specimen is released from the carriage assembly at a desired level above the impact base, the attitude of the test specimen continuing the free fall flight remains at the flight angle fixed while the test specimen was suspended from the carriage assembly.

Figure 8:
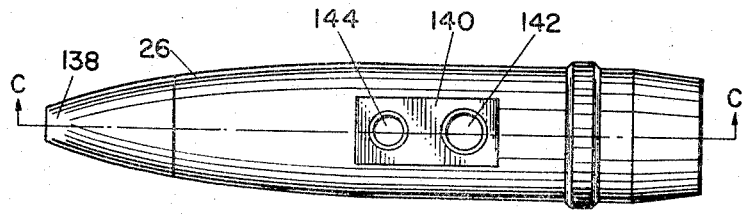
FIG. 8 is a side elevational view of a test specimen appearing as an ordnance projectile having an adapter plate in position.
Figure 9:
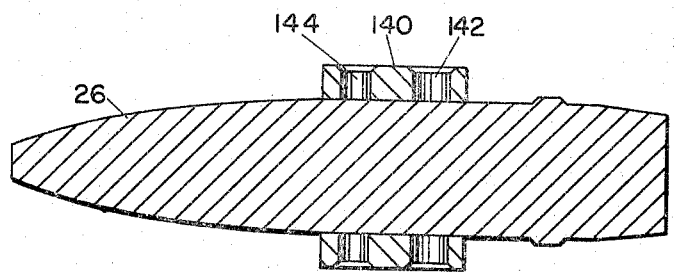
FIG. 9 is a half section taken along section lines C—C of FIG. 8 further illustrating the adapter plates and their relationship on the test specimen.

FIG. 8 represents a side elevational view of test specimen 26 appearing as a bomb having fuse 138 to be tested. Adapter plates 140 may be welded to opposite sides thereof as more clearly illustrated in the half-sectional view of FIG. 9 taken along section lines C—C of FIG. 8. Adapter plates 140 are provided with ports 142 and 144 which may suitably have a tapered inlet for effectively receiving and releasing cleats 134 and 136. Desirably, one of the ports such as port 142 is of a slightly larger diameter to receive larger central cleat 134 whereas the other port 144 is of slightly smaller diameter to receive peripheral cleat 136 therein. Adapter plates 140 may be conveniently welded to test specimen 26 or otherwise secured at a convenient location which may be dictated by balance requirements. The angle for descent of the test specimen during free fall flight may be controlled by standardized angles fixed through positioning peripheral cleats 136 about radial angles from central cleat 134. In this fashion, standardized positions for the flight angle for the test specimen during free fall by gravity may be established. Thus, the angle of impact for the test performance of fuse 138 of test specimen 26 may be regulated.

The various elements of the present apparatus unless otherwise indicated, may be secured to adjoining elements by any suitable means such as bolts, welding, rivets or the like. In addition, auxiliary support or reinforcement members may also be included as part of the apparatus where required.

Although a preferred embodiment of the invention has been illustrated herein, it is to be understood that various changes and modifications may be made in the construction and arrangement of elements without departing from the spirit and scope of the invention as defined in the appended claims.

What is claimed is:
1. An apparatus for impact testing which comprises:
  (a) a main support frame above a point of impact;
  (b) a carriage assembly supportable by said main support frame and having test specimen gripping and releasing means;
  (c) guide means cooperating with said carriage assembly so as to permit free fall thereof in a fixed attitude from a release height above and toward said point of impact;
  (d) detent means connected operatively with said test specimen gripping means;
  (e) detent release means disposed above said point of impact for releasing said detent means and said test specimen gripping means from test specimen holding position;
  (f) lifting means for elevating said carriage assembly to a release height;
  (g) release means for disengaging said lifting means from said carriage assembly at a release height; and
  (h) carriage deceleration and arresting means disposed near said detent release means and above said point of impact and operable subsequent to test specimen release.

2. The apparatus of claim 1 wherein said lifting means for returning said carriage assembly to a release height includes a hoisting wire and an automatic release hook.

3. The apparatus of claim 1 wherein said carriage deceleration means disposed near said intermediate support member is a shock absorber.

4. The apparatus of claim 1 wherein said test specimen gripping means includes a pair of face plates each having a central cleat member and a series of peripheral cleat members for gripping the test specimen at known angles for free fall descent.

5. The apparatus of claim 4 wherein said test specimen is an ordnance projectile having adapter means for receiving said central cleat member and at least one of said peripheral cleat members.

6. The apparatus of claim 1 wherein said detent release means is disposed at a level above said point of impact such that said test specimen will be free of said carriage assembly upon impact with the impact point.

7. The apparatus of claim 1 wherein said detent means includes pivotal arms extending beyond the edges of the carriage assembly when in test specimen holding position and wherein said test specimen gripping means are spring biased against the pivoted arms.

8. The apparatus of claim 2 wherein said automatic release hook disengages said carriage assembly at a point near the upper support member during the lifting thereof by said lifting means.

References Cited
UNITED STATES PATENTS

| | | | |
|---|---|---|---|
| 2,822,687 | 2/1958 | Freedy | 73—12 |
| 2,905,321 | 9/1959 | Hitchner | 73—12 X |
| 3,329,014 | 7/1967 | Stewart | 73—167 |

RICHARD C. QUEISSER, *Primary Examiner.*

C. M. OVERBEY, *Assistant Examiner.*

PO-1050
(5/69)

UNITED STATES PATENT OFFICE
CERTIFICATE OF CORRECTION

Patent No. 3,426,578      Dated February 11, 1969

Inventor(s) Arvids Bergs et al.

It is certified that error appears in the above-identified patent and that said Letters Patent are hereby corrected as shown below:

Column 3, line 4 of printed patent:

Delete the word "by" after operated and insert -- for --

Same line -

After the word "lifting" insert the word -- by --

Column 3, line 5 of printed patent:

Insert the word -- motor -- after power

SIGNED AND
SEALED
JAN 20 1970

(SEAL)
Attest:

Edward M. Fletcher, Jr.
Attesting Officer

WILLIAM E. SCHUYLER, JR.
Commissioner of Patents